(12) United States Patent
Ollila et al.

(10) Patent No.: US 9,167,143 B2
(45) Date of Patent: Oct. 20, 2015

(54) APPARATUS, A METHOD, AND A COMPUTER PROGRAM FOR AUTOMATIC FOCUSING

(75) Inventors: Mikko Ollila, Tampere (FI); Mikko Muukki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 473 days.

(21) Appl. No.: 13/514,014

(22) PCT Filed: Dec. 7, 2009

(86) PCT No.: PCT/FI2009/050983
§ 371 (c)(1),
(2), (4) Date: Aug. 20, 2012

(87) PCT Pub. No.: WO2011/070215
PCT Pub. Date: Jun. 16, 2011

(65) Prior Publication Data
US 2012/0327293 A1 Dec. 27, 2012

(51) Int. Cl.
| | |
|---|---|
| G03B 13/36 | (2006.01) |
| H03K 9/04 | (2006.01) |
| H04N 5/232 | (2006.01) |
| G02B 7/36 | (2006.01) |
| H04M 1/02 | (2006.01) |

(52) U.S. Cl.
CPC ............... *H04N 5/232* (2013.01); *G02B 7/36* (2013.01); *H04N 5/23212* (2013.01); *H04M 1/0264* (2013.01)

(58) Field of Classification Search
CPC .................................................. H04N 5/23212
USPC .................................... 348/345; 396/135, 133
See application file for complete search history.

(56) References Cited

U.S. PATENT DOCUMENTS

| | | | |
|---|---|---|---|
| 2006/0198624 | A1 | 9/2006 | Ono et al. |
| 2008/0199170 | A1 | 8/2008 | Shibuno et al. |
| 2008/0284903 | A1 | 11/2008 | Haruta et al. |
| 2009/0195679 | A1 | 8/2009 | Matsumoto |

(Continued)

FOREIGN PATENT DOCUMENTS

| | | |
|---|---|---|
| JP | 2006064855 | 3/2006 |
| JP | 2008111995 | 5/2008 |
| WO | WO2009139186 | 11/2009 |

OTHER PUBLICATIONS

International Search Report of International Application No. PCT/FI2009/050983—Date of Completion of Search: Sep. 6, 2010—6 pages.

(Continued)

*Primary Examiner* — Joel Fosselman
(74) *Attorney, Agent, or Firm* — Locke Lord LLP

(57) ABSTRACT

An apparatus (500) comprises: an image detector (122) for capturing an image frame ($F_N$), a driving unit (200) for adjusting focusing of light onto said image detector (122), and a pulse generating unit (120), wherein said pulse generating unit (120) is configured to generate one or more synchronization pulses ($S_{11}$, $S_{12}$) based on the timing of optical exposure of a predetermined portion (TRIGLN) of said image frame ($F_N$), and said driving unit (200) is configured to perform said adjusting based on the timing of said one or more synchronization pulses ($S_{11}$, $S_{12}$).

31 Claims, 7 Drawing Sheets

(56) References Cited

U.S. PATENT DOCUMENTS

2009/0245778 A1 10/2009 Shibuno et al.
2009/0256950 A1 10/2009 Kawazoe et al.
2010/0085470 A1* 4/2010 Tsubusaki .................... 348/345

OTHER PUBLICATIONS

Written Opinion of the International Searching Authority of International Application No. PCT/FI2009/050983—Date of Completion of Opinion: Sep. 6, 2010—8 pages.

EPODOC/WPI English language translation of Abstract corresponding to JP2006064855, 2 pages, downloaded Sep. 6, 2010.
Thomson Scientific English machine translation of JP2006064855, pp. 1-32, downloaded Sep. 6, 2010.
English machine translation of WO2009139186, 27 pages, downloaded from WIPO website Jun. 5, 2012.
English Language Machine Translation of Japanese Patent Publication No. 2008111995—31 pages.
Extended European Search Report of EP App. No. 09851995.2—Date of Completion of Search: Sep. 3, 2013, 7 pages.

* cited by examiner

APPARATUS, A METHOD, AND A COMPUTER PROGRAM FOR AUTOMATIC FOCUSING

FIELD OF THE INVENTION

The present invention relates to automatic focusing.

BACKGROUND

A digital photographing device may comprise a camera module, which in turn may comprise an image detector and an autofocus unit. The image detector may be arranged to capture an image of an object, and the autofocus unit may be configured to adjust a distance between a lens and a detector array until a sharp image can be attained. The image detector may be configured to provide image data for the autofocus unit. The autofocus unit may be configured to calculate a sharpness parameter, which indicates the sharpness of the image. The sharpness parameter may be e.g. a value of a modulation transfer function (MTF). The sharpness parameter may be calculated based on the image data provided by the image detector.

Auto focusing (AF) may be performed so that a command to move the lens is transmitted from a host to the camera module. During an auto-focus algorithm, the sharpness of the image may be analyzed each time when a movement of the lens has been completed. The lens may be moved in a stepwise fashion until a predetermined value of the sharpness parameter is attained, i.e. until the image is sharp enough. The lens may be moved by a focusing actuator, which may be e.g. a motor. The autofocus unit may be configured to drive said actuator. The distance between the lens and the image detector may be increased and/or decreased until the image is in its sharpest form.

The operation of a camera module may be controlled by a control unit (host) of a mobile device. In particular, the timing of operations of the focusing actuator may be controlled by the control unit of the mobile device. Different camera modules used in mobile devices are typically controlled in different ways. Thus, controlling software (SW) needs to be re-programmed when a camera module is replaced with a different one. Hardware features and software features of different camera modules are usually so different that interoperability and compatibility are often difficult or impossible to realize.

SUMMARY

An object of the invention is to provide a camera module with auto focusing capability. An object of the invention is to provide a method for automatic focusing.

According to a first aspect of the invention, there is provided an apparatus according to claim 1.

According to a second aspect of the invention, there is provided a method according to claim 13.

According to a third aspect of the invention, there is provided a computer program according to claim 25.

According to a fourth aspect of the invention, there is provided a computer program product according to claim 26.

According to a fifth aspect of the invention, there is provided an image sensor according to claim 27.

According to a sixth aspect of the invention, there is provided a driving unit according to claim 29.

An embodiment of the invention relates to a camera module where the control of accurate timing of the lens movements has been shifted from a control unit to the camera module. In particular, the control of accurate timing may be shifted to the combination of an image sensor and a driving unit.

An embodiment of the invention also relates to a HW-SW interface (Hardware-Software) for specifying the magnitude of the lens movements and the timing of the lens movements.

The camera module may comprise an image detector, e.g. a CMOS array, for capturing an image of an object. The camera module may further comprise a driving unit for adjusting focusing of light onto said image detector. The camera module may further comprise a pulse generating unit configured to generate one or more synchronization pulses based on the timing of optical exposure of a predetermined portion of said image. The driving unit may be configured to perform said adjusting based on the timing of said synchronization pulses.

In particular, the camera module may comprise a re-writable parameter register, which can be called as a low level interface. The camera module may be configured to synchronize lens movements to the timing of the image frame by using parameter values stored in said low level interface.

In an embodiment, different actuator driving units provided by different suppliers may be fully interchangeable. In other words, a combination of a first driving unit and a first actuator may be replaced with a combination of a second driving unit and a second actuator even when said actuators would have completely different operating principles.

Thus, for example, the same image sensor can be easily coupled to different driving units and focusing actuators. There is no need to modify hardware and/or controlling software when the driving unit is replaced.

The image sensor and the driving unit may be implemented on the same semiconductor chip or on different semiconductor chips. Thus, the present solution may provide considerable freedom to design the camera module.

A standardized solution covering several actuator technologies allows more efficient multi-sourcing. The technology-independent solution also allows better compatibility of components in the software level.

Control signals sent by a control unit to the actuator driving unit do not need to be accurately timed, because accurate timing of the actuator operations can be based on synchronization pulses and on an internal timer of the image sensor. The synchronization pulses may be sent directly from an image sensor to the driving unit. Consequently, the controlling interface of the control unit may be simplified.

BRIEF DESCRIPTION OF THE DRAWINGS

In the following examples, the embodiments of the invention will be described in more detail with reference to the appended drawings, in which.

DETAILED DESCRIPTION

Figure 1:
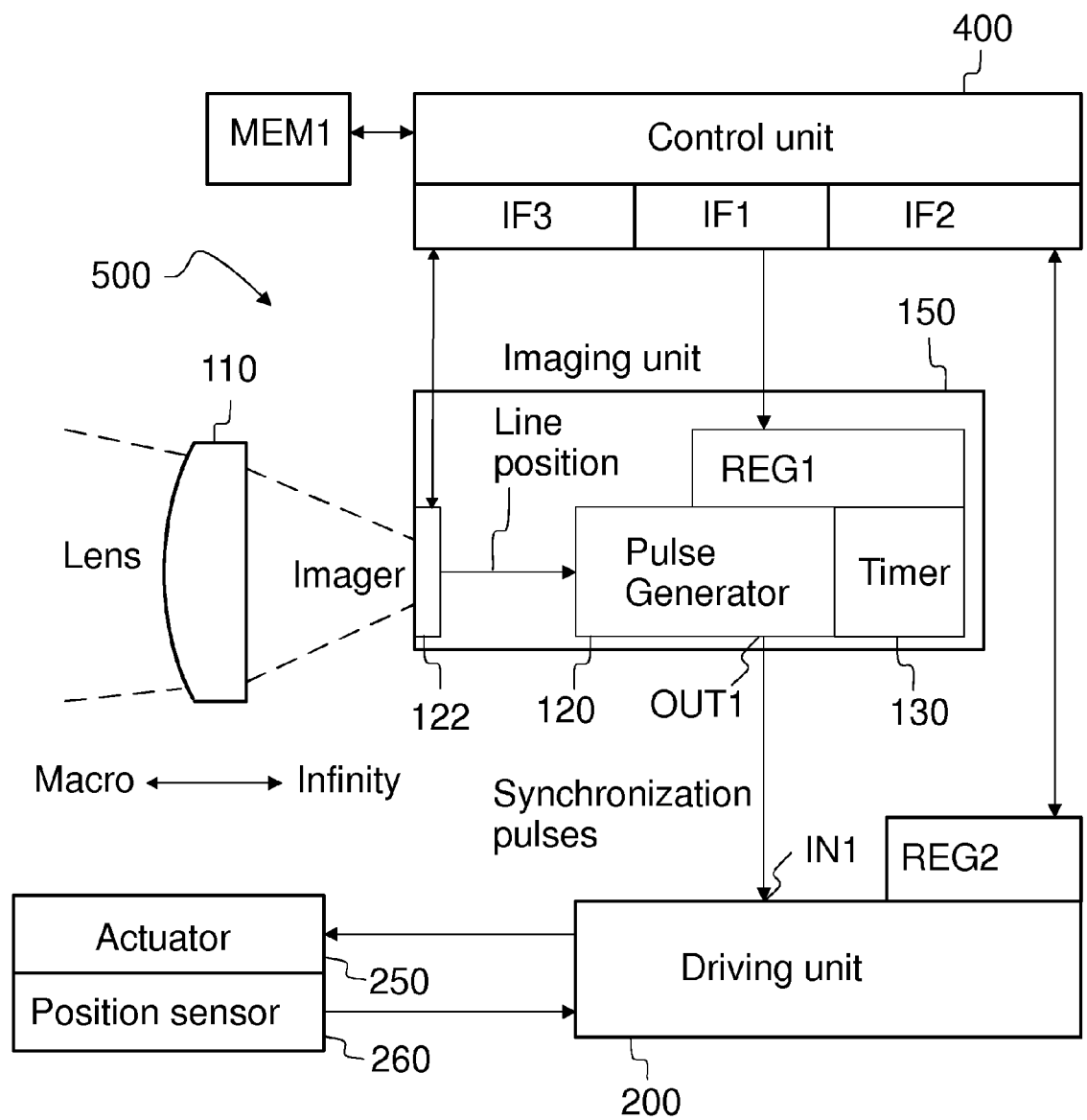
FIG. 1 shows a camera module comprising a pulse generator and an actuator driving unit.

Referring to FIG. 1, a camera module 500 may comprise an image sensor 150, a pulse generator 120, an imaging optics 110, a driving unit 200, and an actuator 250.

The image sensor 150 may comprise an image detector 122 arranged to capture an image of an object. The image detector 122 may be a two-dimensional light detector array. In particular, the image sensor may be e.g. a CMOS device (Complementary Metal-Oxide Semiconductor), or a CCD device (Charge Coupled Device).

The imaging optics 110 may be arranged to focus light on the image detector 122 so that an image of an object (not shown) may be captured. In other words, the combination of the imaging optics 110 may be arranged to capture an image of the object.

The driving unit 200 may be arranged to drive the actuator 250.

The actuator 250 may be arranged to perform focusing by adjusting the distance between the imaging optics 110 and the image detector 122. The distance between the imaging optics 110 and the image detector 122 may be increased in order to capture an image which is close to the camera module 500, i.e. the optics 110 may be moved to a "macro" position. The distance between the imaging optics 110 and the image detector 122 may be decreased in order to capture an image which is far away from the camera module 500, i.e. the optics 110 may be moved to an "infinity position".

The image sensor 150 may be arranged to send line position information to the pulse generator 120. The pulse generator 120 may be arranged to send one or more synchronization pulses to the driving unit 200 based on said line position information in order to synchronize the movements of the actuator with the operation of the image sensor 150. In other words, one or more synchronization pulses may be sent to the driving unit 200 for controlling the timing of operations of the actuator 250.

The pulse generator 120 may be arranged to send a single pulse or pulse sequence comprising a plurality of pulses. The pulse generator may be arranged to send a plurality of pulse sequences. The pulse generator 120 may comprise a timer 130 in order to implement a controlled delay between the consecutive synchronization pulses The operation of the camera module 500 may be controlled by a control unit 400. The control unit 400 may be arranged to communicate with the image sensor 150 and/or with the driving unit 200.

The control unit 400 may comprise one or more processors (e.g. a central processing unit, and/or a digital signal processor).

The timing of the synchronization pulses and/or the number of the synchronization pulses may be controlled by changing parameter values in a first register REG1. The parameter values may be changed e.g. via an interface IF1. The control unit 400 may write the values to the first register REG1, and the pulse generator 120 may read the values from the first register REG1.

Parameters of the first parameter register REG1 may specify e.g. the number of pulses, a delay between rising edges of adjacent pulses ($T_3$), a start line ($k_{TRIG}$) of sequence and/or trigger source (i.e. start or end of exposure).

The image sensor 150 may comprise the first parameter register REG1.

The first parameter register REG1 is aimed for synchronizing and timing, and it may be used for generating synchronization signals. The function of the synchronization pulses is to start lens focus change and calculation of a new lens position in a controlled manner.

Movement direction and/or step size may be controlled by changing parameter values in a second register REG2. The parameter values may be changed e.g. via an interface IF2.

The interfaces IF1, IF2 may be located in the control unit 400. The parameters of the first register REG1 and the parameters of the second register REG2 may also be sent via the same multiplexed data bus. In that case, the interface IF1 may also be arranged to operate as the interface IF2. The data bus may be an I2O bus (i.e. an Inter-Integrated Circuit bus).

The control unit 400 may be considered to comprise a host, which operates on a software level. The image sensor 150 and the driving unit 200 may operate on a hardware level. The purpose of the first parameter register REG1 and the second parameter register REG2 is to define a common interface for camera modules so that additional software development may be minimized for future modules.

In the present solution, the same host can be used with different camera modules that utilize different actuator technologies. Furthermore, a standard solution covering several actuator technologies allows more efficient multi-sourcing. The technology-independent solution allows better reuse of software.

Parameters of the second register REG2 may define what is done by the synchronization pulses, e.g. how much the lens is moved when the driving unit receives a single synchronization pulse. The second register REG2 may e.g. define an end position of the lens 110 or a change in lens position. The second register REG2 may define driving technique. The second register REG2 may also enable measurement of the actuator position automatically and in a synchronized manner.

The second register REG2 may comprise a parameter which specifies the magnitude of a movement of the actuator 250. The second register REG2 may comprise a parameter which specifies the direction of movement of the actuator 250.

The second register REG2 may comprise a parameter which specifies the next position of the actuator 250. The driving unit 200 may determine the magnitude and direction of movement by subtracting the current position from the next position.

For example, the camera module 500 may comprise a position sensor 260, and the current position may be determined e.g. by the position sensor 260. For example, in case of a stepper motor actuator, the absolute position may be determined by counting the number of steps from an end position.

The control unit 400 may write parameter values to the second register REG2, and the driving unit 200 may read the parameter values from the second register REG2.

The actuator control may be performed by writing to the second register REG2 a parameter (Focus_Change) that specifies either a magnitude of a movement of the actuator 250 or an end position of the actuator 250 (see Table 2). The meaning depends on the type of the actuator 250. The parameter Focus_Change may be written by the control unit 400. After writing, the driving unit 200 may start to drive the actuator 250 such that a lens or a lens system 110 is moved.

The second parameter register REG2 may comprise parameters specifying the number of pulse sequences, and the number of pulses within a single pulse sequence.

Furthermore, the second parameter register REG2 may comprise parameters specifying an end point, direction and/or magnitude for a single actuator movement triggered by an individual synchronization pulse.

A parameter (Focus_Change_Control Bit1) stored in the second register REG2 may define different driving methods. The movement may be triggered by a synchronization pulse (synchronous driving), or the movement may be executed immediately after the value of the parameter Focus_Change has been written in the second register REG2 (asynchronous driving).

By selecting synchronous driving and by configuring generation of synchronization pulses, one may get a desired number of short movements during a single image frame $F_N$.

The parameter values of the first register REG1 are mainly set by the control unit 400. However, also the driving unit 200 may be arranged to change certain parameters in the first register REG1.

For example, a parameter $N_{SEQ}$ (Number_of_Sequences) may specify the number of sequences to be generated. The control unit 400 may change the value of $N_{SEQ}$ from 0 to 2 in order to indicate that two pulse sequences may be generated. A non-zero value of $N_{SEQ}$ may enable pulse generation. After that, the driving unit 200 may decrease the value of $N_{SEQ}$ by one each time a pulse sequence has been generated, until $N_{SEQ}$ is equal to zero. If the host sets $N_{SEQ}=1$, then only one sequence is performed.

The value of the current value of the parameter $N_{SEQ}$ may also be defined in a metadata of an image frame $F_N$. This may improve synchronization because the host may thus know which one of the synchronization pulses is in question during a certain frame $F_N$.

The control unit 400 may read image data from the image sensor 150 e.g. via an interface IF3.

The first parameter register REG1 may also be called as a "low level interface", and the second parameter register REG2 may also be called as a "high level interface". The interface IF1 may refer to the same entity as the first register REG1. The interface IF2 may refer to the same entity as the second register REG2. IF1 and REG1 may also be different entities and they may be located e.g. in different semiconductor chips. IF1 does not need to be capable of storing the values of parameters. IF2 and REG2 may also be different entities. Movements of the actuator 250 may be timed and/or interrupted in known and controlled manner. The first register REG1 acts as a master to higher-level operations controlled by the second register REG2, wherein the timing of said higher-level operations is controlled by said first register REG1.

Thanks to using the first register REG1 as the master, stopping of the actuator movement can be accurately controlled. In particular, the stopping position of the actuator can be accurately known.

The image sensor 150, in particular the pulse generator 120 may comprise an output OUT1 for sending the synchronization pulses. The driving unit 200 may comprise an input IN1 for receiving the synchronization pulses.

Parameters stored in the second register REG2 (high level interface) may define at least one of the following: next lens position, a change in lens position, driving technique, automatic measurement of a lens position.

The image sensor 150 may be configured to synchronize lens control to timing of an image frame $F_N$, based on parameters stored in the first register REG1 (low level interface). Actuator movements specified by parameters of the second register REG2 may be timed according to the synchronization pulses generated according to parameters of the first register REG1.

The present solution of moving AF timer functionality to the image sensor 150 makes it possible to carry out synchronization very accurately in respect of the exposure of an image frame $F_N$.

The camera module 500 may comprise a memory MEM1 e.g. for storing image data, parameter values and/or computer program. In particular, the memory MEM1 may be a computer readable medium comprising program code, which when executed by the control unit 400 is for performing automatic focusing.

The combination of the memory MEM1 and the control unit 400 may be configured to support different actuator technologies (see table 3). The actuators may belong e.g. to one or more of the following groups: actuators with linear control characteristics, actuators with absolute position system, actuators without position sensors, actuators with a home detection position sensor, lens systems without moving optics. Different types of actuators may have different control characteristics.

The memory MEM1 may comprise calibration data and configuration data. The calibration data may be specific to an individual actuator 250, or the calibration data may be specific to a certain batch of manufactured actuators. Thus, the actuator 250 may be controlled according to its control characteristics. The memory MEM1 may comprise calibration data to support several different actuator types. The memory MEM1 may comprise computer program code for controlling both relative actuators and absolute actuators.

TABLE 1

Possible parameters of the first register REG1.

| Parameter | Type | Description |
| --- | --- | --- |
| Low_Level_Control | 1-bit | Specifies a trigger source. 0 = integration line number is used as main trigger reference; 1 = readout line number is used as main trigger reference. |
| Number_of_Sequences ($N_{SEQ}$) | 7-bit | Specifies the number of pulse sequences. Value = number of pulse sequences. 0 = disabled; 1 = single sequence; 2 = two sequences, etc. |
| Main_Trigger_Ref_Point ($k_{TRIG}$) | 16-bit | Specifies the main trigger reference. Value = line number at which a pulse sequence will be triggered (trigger reference). The source is specified by the parameter Low_Level_Control. |
| Main_Trigger_Count | 8-bit | Specifies the number of pulses in the main sequence. The start is defined by the Main_Trigger_Ref Point. |
| Main_Trigger_T3 ($T_3$) | 16-bit | Specifies delay between pulses in the main sequence. 1 = delay between pulses is 10 µs; 2 = delay between pulses is 20 µs; etc. 0 = only a single pulse will be generated. |
| Phase1_Trigger_Count | 8-bit | Specifies the number of pulses of the first phase PHASE1. 0 = the first phase does not contain any pulses; 1 = the first phase contains one pulse; 2 = the first phase contains two pulses, etc. |
| Phase1_Trigger_T3 | 16-bit | Specifies delay between pulses in the PHASE1 sequence. 1 = delay between pulses is 10 µs; 2 = delay between pulses is 20 µs; etc. 0 = only a single pulse will be generated. |
| Phase2_Trigger_Count | 8-bit | Specifies the number of pulses of the second phase PHASE2. 0 = the first phase does not contain any pulses; 1 = the first phase contains one pulse; 2 = the first phase contains two pulses, etc. |
| Phase2_Trigger_T3 | 16-bit | Specifies delay between pulses in the PHASE2 sequence. 1 = delay between pulses is 10 µs; 2 = delay between pulses is 20 µs; etc. 0 = only a single pulse will be generated. |

The parameters Low_Level_Control and Number_of_Sequences may be defined by a single 8-bit parameter.

The parameters of the second register REG2 may define a common interface for different camera modules 500 or driving units 200 so that additional software development may be minimized for future modules. Among other things, the second register REG2 may define how much the lens 110 is moved per one synchronization pulse. Thus, the second register REG2 may define the absolute position of the lens 110 or a change in lens position. The second register REG2 may further enable lens position measurement in synchronized manner and automatically.

A single parameter Focus_Change may comprise all 16 bits mentioned in Table 2.

Precise timing of the actuator movements may be ensured if the parameters of the second register REG2 are modified before enabling the generation of the synchronization pulses. The synchronization pulses may be enabled by modifying the parameters of the first register REG1.

The parameters of the first register REG1 and the second register REG2 should be selected such that the actuator movements are stopped in a controlled fashion. Preferably, genera-

TABLE 2

Possible parameters of the second register REG2.

| Parameter | Type | Description |
| --- | --- | --- |
| Focus_Change | 16-bit | Specifies next position of the actuator, or the magnitude of movement per each synchronization pulse, depending on the Actuator_Type (see table 3). Default = 0. |
| Focus_Change_Control Bit0 | 1-bit | 0 = disable driving; 1 = enable driving. |
| Focus_Change_Control Bit1 | 1-bit | 0 = asynchronous driving; 1 = driving timed by the synchronization pulses |
| Focus_Change_Control Bit2 | 1-bit | 0 = single image frame; 1 = multiple frames. |
| Focus_Change_Control Bit3 | 1-bit | 0 = single phase driving; 1 = two-phase driving. |
| Focus_Change_Control Bit4 | 1-bit | 0 = only PHASE1 is executed; 1 = both PHASE1 and PHASE2 are executed. |
| Focus_Change_Control Bit5 | 1-bit | 0 = direction of movement is from infinity to macro; 1 = direction of movement is from macro to infinity. |
| Focus_Change_Control Bit6 | 1-bit | 0 = do not measure position; 1 = immediately measure position. |
| Focus_Change_Control Bit7 | 1-bit | 0 = do not measure position; 1 = measure position but wait until single-phase or two-phase driving has been completed. |
| Focus_Change_Control Bit8 | 1-bit | 0 = no reset; 1 = immediately stops driving and resets all parameters of REG2. Also resets itself from 1 to 0 (Autoclear). |
| Focus_Change_Control Bit9 | 1-bit | 0 = disable ringing compensation (i.e. overshoot compensation); 1 = enable ringing compensation. |
| Focus_Change_Control Bit10 | 1-bit | Reserved for future purposes |
| Focus_Change_Control Bit11 | 1-bit | Reserved for future purposes |
| Focus_Change_Control Bit12 | 1-bit | Reserved for future purposes |
| Focus_Change_Control Bit13 | 1-bit | Reserved for future purposes |
| Focus_Change_Control Bit14 | 1-bit | Reserved for future purposes |
| Focus_Change_Control Bit15 | 1-bit | Reserved for future purposes |
| Focus_Change_Number_Phase1 | 10-bit | Specifies the magnitude of movement for each synchronization pulse during PHASE1. |
| Strobe_Count_Phase_1 | 8-bit | Specifies the number of pulses counted during a PHASE1 sequence. |
| Focus_Change_Number_Phase2 | 10-bit | Specifies the magnitude of movement for each synchronization pulse during PHASE2. |
| Strobe_Count_Phase_2 | 8-bit | Specifies the number of pulses counted during a PHASE2 sequence. |
| Position | 16-bit | Specifies the position of the actuator detected by the position sensor | tion of the synchronization pulses should be stopped before modifying the parameters of the second register REG2.

The usage of the first register REG1 is advantageous, because based on status data (metadata) embedded in the image frame $F_N$, the control unit 400 may know what was the actuator position before the optical exposure of an image frame, during the optical exposure of the image frame, and after the optical exposure of the image frame $F_N$. Thus, the control unit 400 may know the actuator position as a function of time, with respect to the timing of an image frame $F_N$. In other words, selected values of the first register REG1 may be attached to each image frame $F_N$.

A stopping command may be executed e.g. in the following manner: When synchronization pulses are generated, the control unit 400 may set the parameter Number_of_Sequences ($N_{SEQ}$) to zero in the first register REG1. This will stop generation of the pulses, but not immediately. If pulse generation is going on within a pulse sequence, pulse generation continues to the end of the sequence. Thus, the movement can be stopped in a controlled way.

Alternatively, the control unit 400 may set the parameter Focus_Change_Control Bit0 to zero. In this way, the movement may also be stopped in a known manner. This means that e.g. in an automatic ringing compensation mode (i.e. when performing overshoot compensation), the movements are finished by executing the full programmed movement sequence. The same applies also when driving to the home position, and when measuring the position. If single-phase driving is used, the number of successive movements is controlled by the parameter Strobe_Count_Phase_1 of the second register REG2. If two-phase driving is applied, the number of successive movements is controlled by the parameters Strobe_Count_Phase_1 and Strobe_Count_Phase_2.

Setting the parameter Focus_Change_Control Bit0 to zero interrupts the current sequence after it has been completed, but this does not have an effect on the other parameters of the second register REG2. The reason to wait until the end of the sequence is to ensure that the movement is stopped at a known position.

The second register REG2 may further comprise e.g. a parameter measposition bit6. If measposition bit6=1, this specifies that the position of the lens/actuator will be measured after completion of the current movement sequence.

If immediate stopping is wanted, the control unit 400 may set the parameter Focus_Change_Control Bit8 of the second register REG2 to one. However, this may result in unknown stopping position, e.g. due to lack of overshoot compensation.

Setting the parameter Focus_Change_Control Bit8 to one causes that all other bits of a command are ignored, the current movement sequence is interrupted, all bits of the Focus_Change parameter are reset, and all parameters of the second register REG2 are set to default values. The execution of the immediate stop has the highest priority. It may also reset other internal control registers such as a target value of the actuator 250. The parameter Focus_Change_Control Bit8 is automatically reset after execution.

The use of the first register REG1 and the second register REG2 may be synchronized by using the parameters Strobe_Count_Phase_1 and Strobe_Count_Phase_2 of the second register REG2. This is useful e.g. in two-phase driving, but also when the stopping is done without using information sent via embedded status lines (i.e. via metadata embedded in the image frames).

The parameter Strobe_Count_Phase_1 may also be set to a high value in single phase driving. In this case, the driving can be controlled by enabling and/or disabling the generation of the synchronization pulses, wherein the parameter Strobe_Count_Phase_1 does not have an effect on the stopping due to its high value.

Example Case 1

The parameter may be set as follows: Main_Trigger_Count=3, Number_of_Sequences=2, Strobe_Count_Phase_1=3. Now, two pulse sequences will be generated, wherein each sequence consists of three pulses. When the input IN1 of the driving unit 200 receives the pulses, the following happens: when no pulses have been received, the Strobe_Count_Phase_1 is equal to zero. After the 1st pulse, Strobe_Count_Phase_1 is equal to 1. After the 2nd pulse, Strobe_Count_Phase_1 is equal to 2. After the 3rd pulse, Strobe_Count_Phase_1 is equal to 3. After the 4th pulse, Strobe_Count_Phase_1 is equal to 1. After the 5th pulse, Strobe_Count_Phase_1 is equal to 2. After the 6th pulse, Strobe_Count_Phase_1 is equal to 3.

Example Case 2

Parameters of the second register REG2 are set.
Parameters of the first register REG1 are set.
Generation of the synchronization pulses in enabled; this starts actuator movements.
The movements are stopped when the generation of the pulses is stopped, based on timer 130 of the pulse generator 120.
The control unit 400 waits until the movements are finished. The control unit 400 may detect completion of the movement sequence by monitoring the status of the parameter Number_of_Sequences. When the parameter Number_of_Sequences has reached zero, this indicates that the movement sequence has been completed.
The control unit may disable pulse generation by setting Focus_Change_Control Bit0 to zero.

Example Case 3

Parameters of the second register REG2 are set.
Parameters of the first register REG1 are set.
Generation of the synchronization pulses in enabled; this starts actuator movements.
The control unit 400 may set the parameter Number_of_Sequences to zero in the first register REG1 in order to stop the movements (The current value of the parameter Number_of_Sequences may be attached as metadata to each image frame $F_N$).
The control unit may disable pulse generation by setting Focus_Change_Control Bit0 to zero.

Example Case 4

Figure 2A:
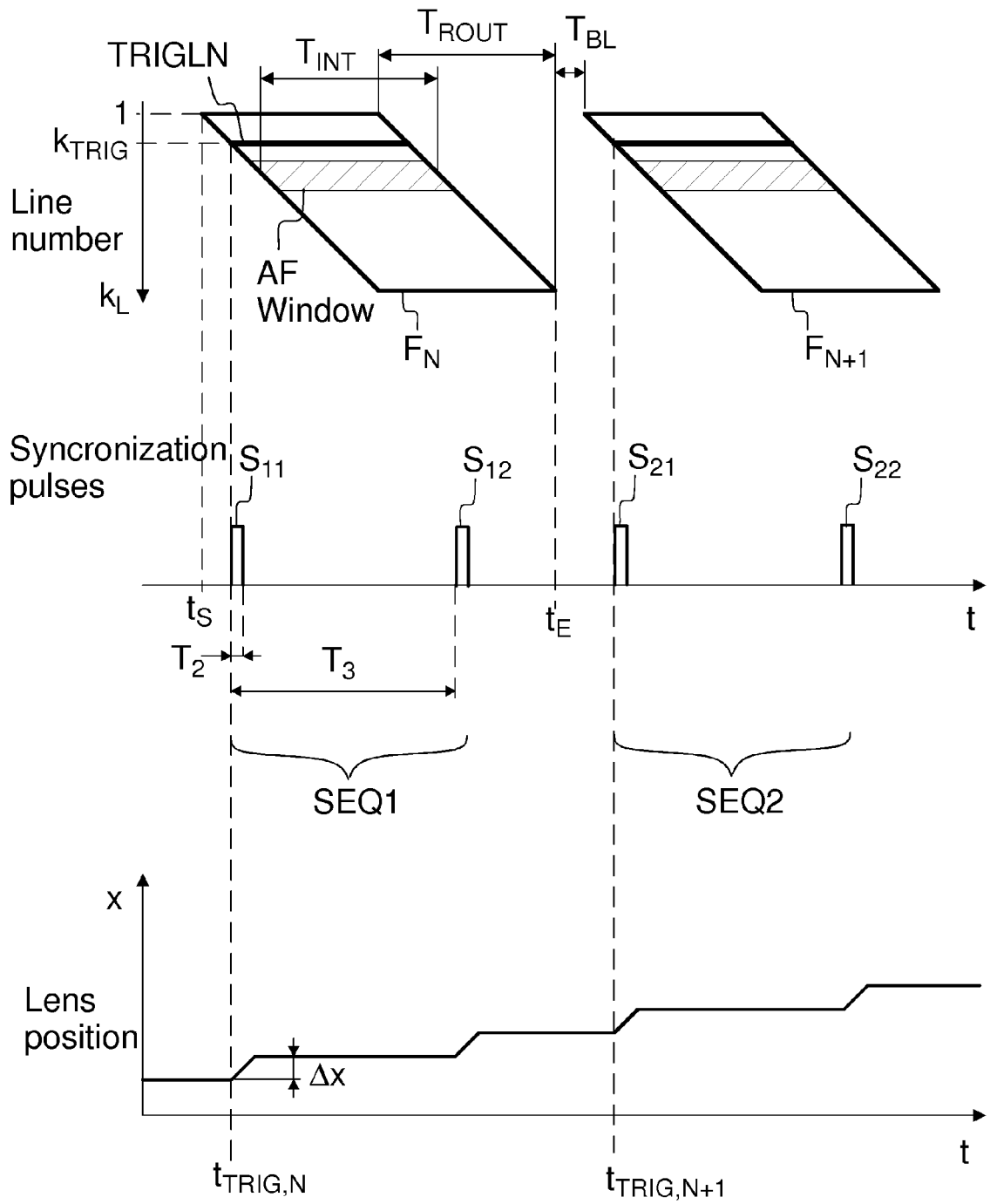
FIG. 2*a* shows pulse generation based on a detected event.

Parameters of the second register REG2 are set.
Parameters of the first register REG1 are set.
Generation of the synchronization pulses in enabled; this starts actuator movements.
The control unit 400 may set the parameter Number_of_Sequences to zero in the first register REG1 in order to stop generation of pulses.
The control unit 400 may set the parameter parameter Focus_Change_Control Bit8 of the second register REG2 to one in order to immediately stop the movements.
FIG. 2a shows generation of the synchronization pulses based on detected events.

An individual image frame $F_N$ may comprise pixels arranged in lines (i.e. rows) and columns. The image frame $F_N$ may comprise pixels arranged e.g. in 1080 lines, wherein each line may comprise e.g. 1920 pixels. The brightness values and/or color values associated with each pixel may be determined by exposing each light-sensitive detector of the image detector 122 to light focused by the imaging optics 110. The detectors of the image detector 122 may also be arranged in an array, in rows and columns. Each detector is exposed to light for a predetermined period.

AF window indicates a portion of the image frame, which may be used for determining the sharpness parameter(s).

Individual light detectors of the image detector 122 are typically arranged in lines and rows. The exposure of different lines of the image detector 122 may start at different times. Consequently, the exposure of different lines of an image frame may start at different times. In case of the rolling shutter approach, the optical exposure of the lines is not simultaneous. For example the optical exposure of the first line of an image frame may even be completed before the optical exposure of the last line of said image frame has started.

The rhombic pattern $F_N$ in the upper left portion of FIG. 2a indicates the timing of optical exposure of pixel lines of the image frame $F_N$. In this case, the optical exposure of the first line of the image frame $F_N$ takes place before the optical exposure of the last line of said image frame $F_N$.

t denotes time. $k_L$ indicates the number of a pixel line. $t_S$ denotes the start time of optical exposure of the first pixel line of the image frame $F_N$. $t_E$ denotes the end of optical exposure of the last pixel line of the image frame $F_N$.

$T_{INT}$ denotes the time period for the optical exposure of a single line. $T_{ROUT}$ denotes a time period for reading the pixel values out of the image detector 122 (i.e. a read-out period). $F_{N+1}$ denotes the next image frame. $T_{BL}$ denotes a blanking time, i.e. a time period between the end of the read-out period of the image frame $F_N$ and the start of the read-out period of the next image frame $F_{N+1}$.

The pulse generator 120 may be arranged to generate one or more synchronization pulses $S_{11}$, $S_{12}$ based on a detected event. The event may be e.g. start of the optical exposure of a predetermined line TRIGLN of the image frame $F_N$. $k_{TRIG}$ denotes the line number of said predetermined line TRIGLN, i.e. a trigger number. Alternatively, the event may also be e.g. reaching the end of the optical exposure of said predetermined line TRIGLN of the image frame $F_N$. The end of the optical exposure may substantially coincide with reading of the pixel values of said predetermined line TRIGLN.

Thus, the pulse generator 120 may be arranged start the generation of one or more synchronization pulses $S_{11}$, $S_{12}$, when the exposure of a predetermined line TRIGLN is started or finished. The first pulse $S_{11}$ of the sequence may be synchronized with the start of exposure $t_{TRIG}$ of a predetermined line TRIGLN.

The control unit 400 may write the value of $k_{TRIG}$ to the first register REG1, and the image sensor 150 may read it. The value of $k_{TRIG}$ may be e.g. equal to 200. Thus, the pulse generator 120 may send a synchronization pulse $S_{11}$ when the exposure of the line 200 has been finished.

However, if the operation of the pulse generator 120 is enabled after the exposure of the line 200 has been started, then the pulse generator will not send a synchronization pulse during the capturing of the current image frame $F_N$. Rather, the synchronization pulse will be generated when the exposure of the line 200 of the next image frame $F_{N+1}$ is started.

$t_{TRIG,N}$ denotes a time when the event associated with the image frame $F_N$ is detected. The first synchronization pulse $S_{11}$ may be generated immediately after the event is detected. $T_2$ denotes the duration of the pulse $S_{11}$.

One or more further synchronization pulses $S_{12}$ may also be optionally generated. SEQ1 denotes a pulse sequence triggered by a first event. The time period $T_3$ between subsequent synchronization pulses is preferably selected such that the movement or change initiated by a first pulse $S_{11}$ is completed before a next pulse $S_{12}$ is received.

A second pulse sequence SEQ2 may be triggered by a second event associated with the next image frame $F_{N+1}$. $t_{TRIG,N+1}$ denotes the time when the second event is detected. The second pulse sequence SEQ2 may consist of pulses $S_{21}$, $S_{22}$.

The driving unit 200 may be arranged to move the actuator 250 by a predetermined step Δx each time when the driving unit 200 receives a pulse $S_{21}$, $S_{22}$.

The first register REG1 may comprise parameters, which specify the number of pulses of an individual sequence, the time delay $T_3$ between pulses, the number of sequences, and/or the trigger number $k_{TRIG}$.

Consequently, the control unit 400 may control the generation of several synchronization pulses just by writing new parameter values to the first register REG1. There is no need to use the data processing capacity of the control unit 400 for precise timing of the actuator movements. When the timing of the actuator movements is on the responsibility of the image sensor 150 and the driving unit 200, this removes the dependency on the properties of the host. Consequently, the timing of operations performed by the control unit 400 is not critical in this sense.

The magnitude of a single movement may be controlled by changing the value of the parameter Focus_Change (see table 2). The number of successive movements may be controlled by changing the value of the parameter Main_Trigger_Count (see table 1).

Driving of the actuator 250 may be controlled by changing the magnitude of a movement and/or by changing the number of successive movements. However, changing the magnitude of a single movement may be a relatively slow operation when compared with changing the number of successive movements.

For example, the control unit 400 may comprise a separate integrated circuit for determining the value of the parameter Focus_Change, and data should be communicated to said integrated circuit in order to adjust the value of the parameter Focus_Change. In that case, a separate timing signal may be needed for synchronization, because communication via an I2C data bus may be slow and/or it does not necessarily take place in real time.

In the present solution, the autofocus control is arranged to the image sensor 150 and the driving unit 200. This removes dependency on host properties and does not require strict timing from the host. The timer functionality may also be moved from the host to the image sensor 150. By this, it is accurately known, when the lens is moving.

Thanks to the synchronization pulses, the timing relationship between the exposed portions of an image frame $F_N$ and the actuator movements can be accurately known. Consequently, the boundaries of each portion utilized in the focusing algorithm can be defined accurately.

The control unit 400 or a further unit may be arranged to determine a sharpness parameter, which represents the sharpness of a portion of the image frame $F_N$. The sharpness parameter may be e.g. an entropy value, a value of a modulation transfer function (MTF) or the highest spatial frequency appearing in the image portion. When performing an auto focusing algorithm, the control unit 400 may be configured to adjust the focusing in order to reach an optimum value of the sharpness parameter. In particular, the position of the imaging optics 110 may be sequentially changed until an optimum value of the sharpness parameter is attained. The optimum value may be e.g. a minimum value, a maximum value, a value which is greater than a predetermined limit, or a value which is smaller than a predetermined limit.

Figure 4:
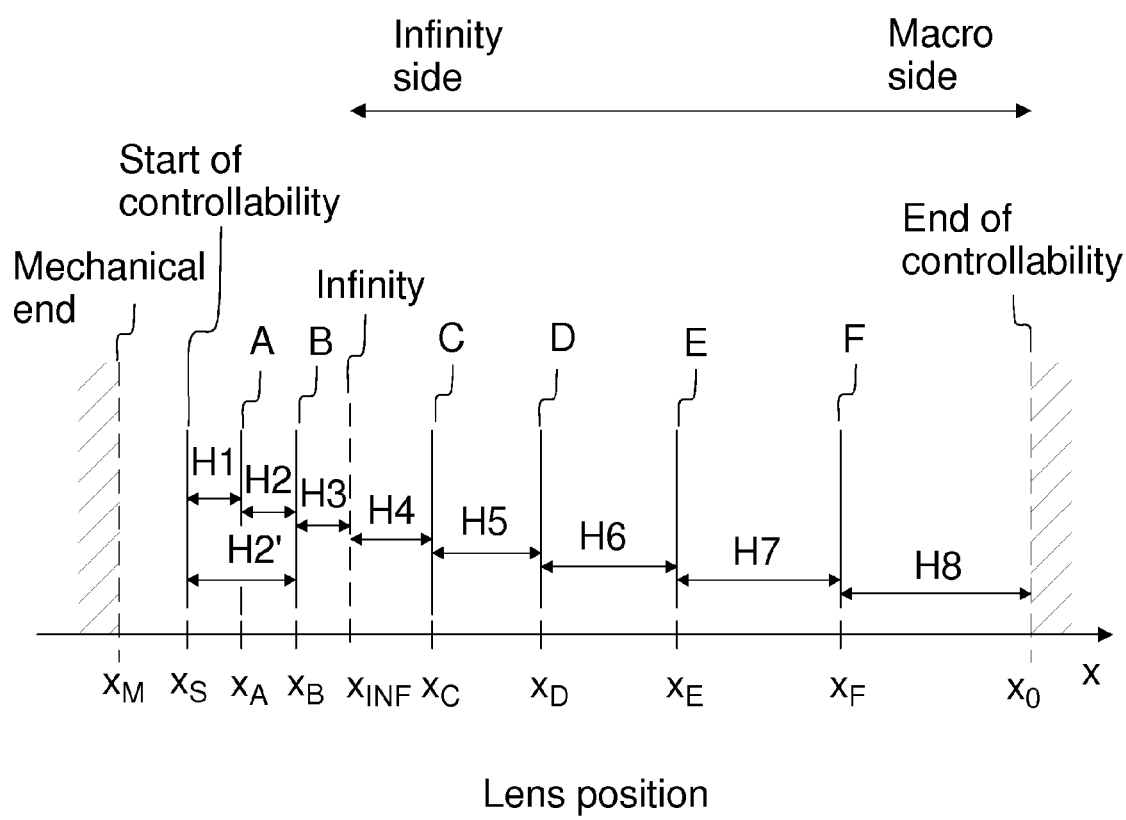
FIG. 4 shows a plurality of positions in a focusing range.

For example, a first portion of the image frame $F_N$ may be captured when the focusing actuator 250 is in a first position $x_C$ (see FIG. 4). The actuator 250 may be driven to a second position $x_D$ after the optical exposure of the first portion has been finished. A second portion of the image frame $F_N$ or a portion of the next image frame $F_{N+1}$ may be captured when the focusing actuator 250 is in a second position $x_D$.

The focusing can be performed more effectively when the first portion and said second portion can be associated with well-defined positions of the actuator 250, i.e. the actuator should not be moved during optical exposure of said image portions.

A third image portion may be captured when the actuator 250 is moving, wherein image information of said third image portion may also be utilized when performing the auto focus algorithm. Movement of the actuator during the optical exposure may be taken into consideration. Furthermore, the position of the actuator when the optical exposure of the third portion was started, and/or the position of the actuator when the optical exposure of the third portion was finished, may be taken into consideration.

Figure 2B:
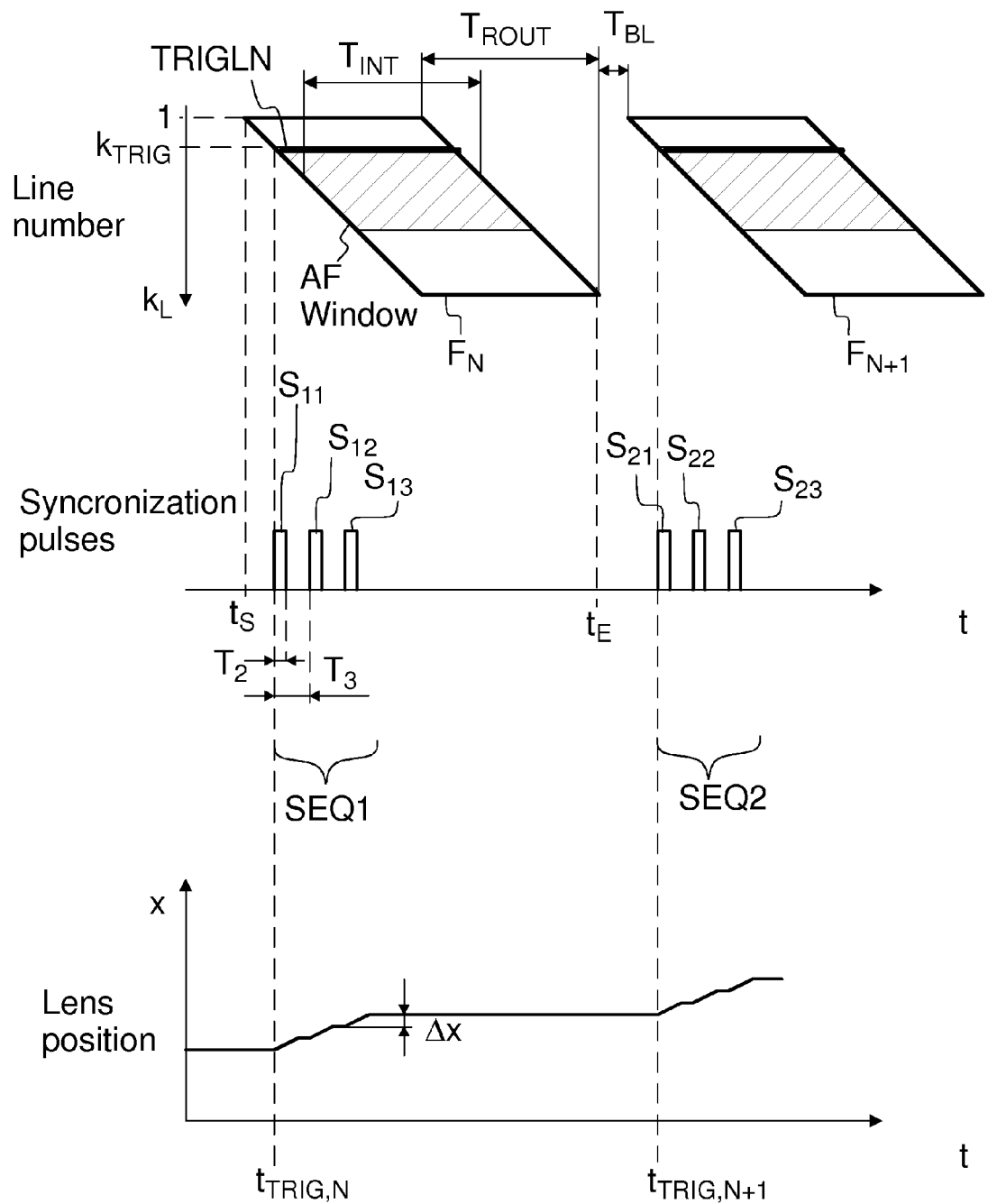
FIG. 2*b* shows pulse generation, wherein the actuator is moved during optical exposure.

FIG. 2b shows a situation where the actuator 250 is moved during optical exposure of the autofocus window AF of the image frame $F_N$. This may be acceptable e.g. when the magnitude of a movement is small and/or if the focusing algorithm is not yet in a fine search mode. The focusing algorithm may start by using coarse steps and finish by using fine steps.

The first pulse sequence SEQ1 shown in FIG. 2b has three pulses $S_{11}$, $S_{12}$, $S_{13}$. The second pulse sequence SEQ2 has also three pulses $S_{21}$, $S_{22}$, $S_{23}$.

Figure 3A:
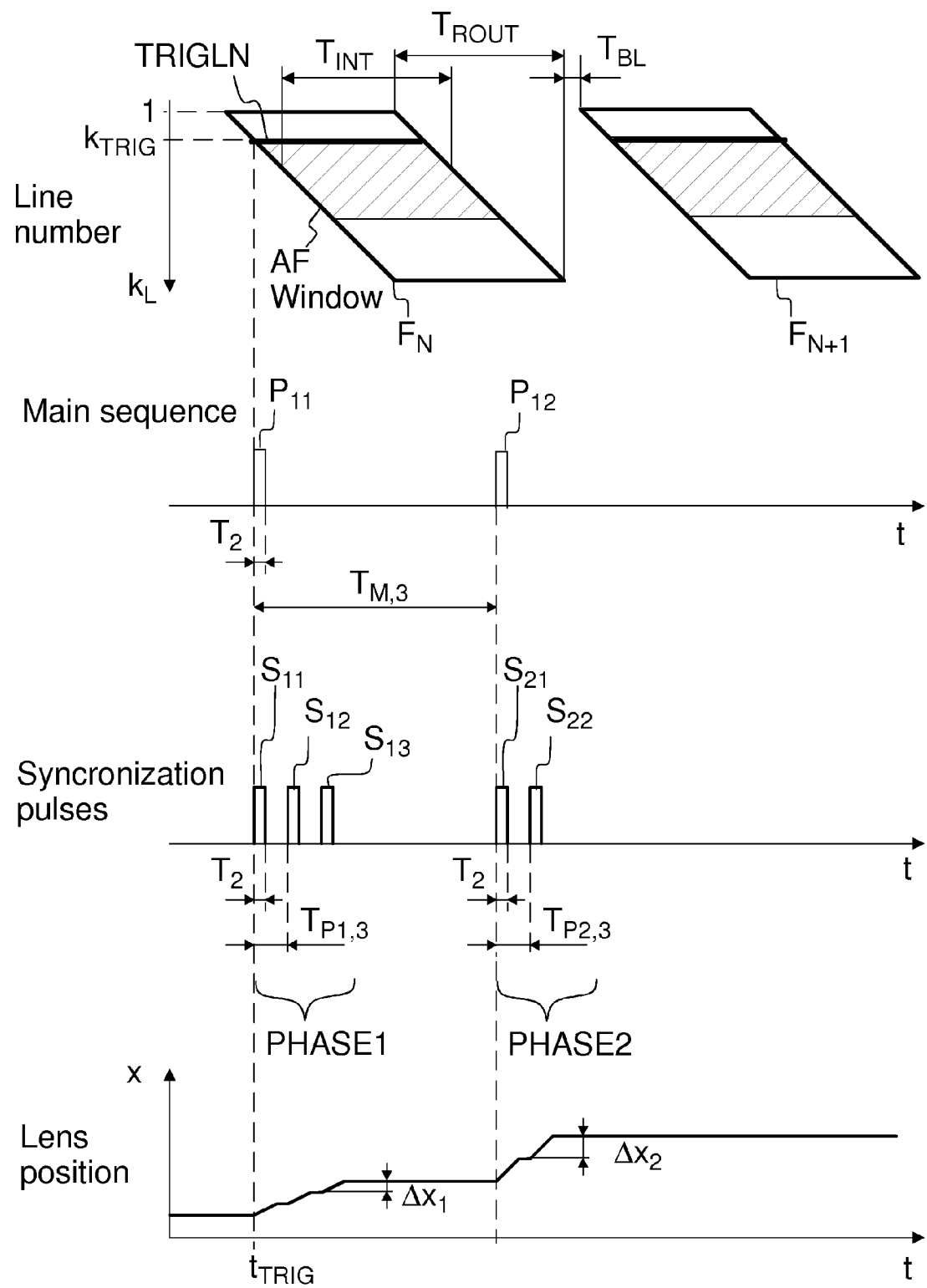
FIG. 3*a* shows generation of pulses in two phases.

Referring to FIG. 3a, a single event may also trigger driving in two phases, wherein movements of the actuator 250 in the first phase PHASE1 may be smaller (or larger) than in the second phase PHASE2. In particular, movements $\Delta x_1$ during the optical exposure of the AF Window may be smaller than movements $\Delta x_2$ after the exposure of the AF Window. The lens 110 may be moved in smaller steps until the exposure of the AF Window of the next image frame $F_{N+1}$ is started.

$\Delta x_1$ denotes the magnitude of a single actuator movement during the first phase PHASE1. $\Delta x_2$ denotes the magnitude of a single actuator movement during the second phase PHASE2.

Occurrence of an event may trigger generation of a "main" pulse $P_{11}$. The pulse generator 120 may comprise a timer 130 in order to generate a second pulse $P_{12}$ after a predetermined time period $T_{M,3}$.

The first main pulse $P_{11}$, may trigger the generation of synchronization pulses $S_{11}$, $S_{12}$, $S_{13}$ of the first phase PHASE1. $T_{P1,3}$ denotes the time period between consecutive synchronization pulses $S_{11}$, $S_{12}$, $S_{13}$ of the first phase PHASE1.

The second main pulse $P_{12}$, may trigger the generation of synchronization pulses $S_{21}$, $S_{22}$, of the second phase PHASE2. $T_{P2,3}$ denotes the time period between consecutive synchronization pulses $S_{21}$, $S_{22}$, of the second phase PHASE1.

The first parameter register REG1 may comprise parameters specifying the time delay $T_{M,3}$, the number of pulses of the first phase PHASE1, the number of pulses of the second phase PHASE2, the time delay $T_{P1,3}$, and/or the time delay $T_{P2,3}$.

The second parameter register REG2 may comprise parameters specifying the number of pulses of the first phase PHASE1, and the number of pulses of the second phase PHASE2.

Furthermore, the second parameter register REG2 may comprise parameters specifying an end point, direction and/or magnitude for a single actuator movement during the first phase PHASE1 and the second phase PHASE2.

The magnitude $\Delta x_2$ of movement during the second phase PHASE2 may be e.g. in the range of 20% to 80% of the magnitude $\Delta x_1$ of movement during the first phase PHASE1.

The magnitude $\Delta x_2$ of movement during the second phase PHASE2 may be e.g. in the range of 120% to 500% of the magnitude $\Delta x_1$ of movement during the first phase PHASE1.

Figure 3B:
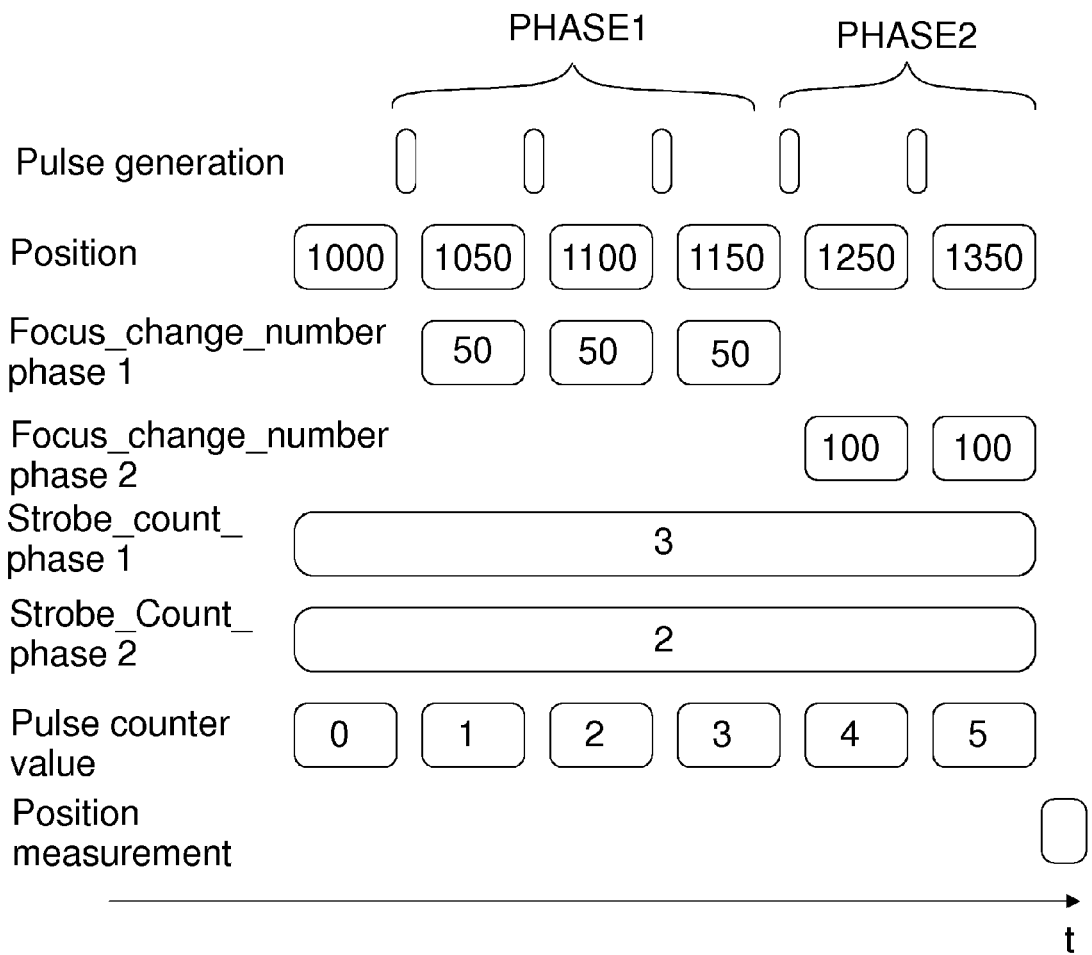
FIG. 3*b* is a timing chart corresponding to the situation of FIG. 3*a*.

FIG. 3b is a timing chart related to the situation shown in FIG. 3a. Five pulses may be generated in two phases, wherein the first phase PHASE1 comprises three pulses and the second phase PHASE2 comprises two pulses. The actuator 250 is initially at a position 1000. Step size for the first phase PHASE1 may be e.g. 50, and step size for the second phase PHASE2 may be e.g. 100. The position of the actuator may be automatically measured after the second phase PHASE2 has been completed.

Automatic focusing may be performed more effectively if the relationship between actuator positions and actual object distances is known. For that purpose, calibration parameters may be stored e.g. in the memory MEM1. The parameters may be stored in the memory MEM1 e.g. at the same time when the controlling software of the camera module is installed. This may take place e.g. in a manufacturing line or in a repair workshop.

The calibration parameters could also be stored in the second register REG2.

Referring to FIG. 4, the controllable movement range of the actuator 250 may comprise e.g. up to nine positions, namely start of controllability at the position $x_S$, point A at the position $x_A$, point B at the position $x_B$, infinity at the position $x_{INF}$, point C at the position $x_C$, point D at the position $x_D$, point E at the position $x_E$, point F at the position $x_F$, and end of controllability at the position $x_O$.

The position $x_S$ represents a minimum distance between the lens 110 and the image detector 122. The position $x_O$ represents a maximum distance between the lens 110 and the image detector 122 (i.e. the macro position).

The points A and B may be beyond the infinity position $x_{INF}$. This means that a perfectly sharp image cannot be captured even if the object would be positioned at an infinite distance. Sometimes the relationship between a sharpness parameter and the lens position can be determined more accurately and/or reliably when the value (or values) of the sharpness parameter is also determined at a position (or positions) which are beyond infinity. A curve representing the value of the sharpness parameter as a function of the position may be substantially flat in the vicinity of the position $x_{INF}$. An optimum position providing the best focus (i.e. the sharpest image) can be found e.g. by determining a position where the gradient of said curve is substantially equal to zero. Alternatively, the best focus can be found e.g. by determining two auxiliary positions where the sharpness parameter has decreased by a predetermined amount from its maximum value, and by determining the optimum position by interpolating a location between said two auxiliary positions. Driving of the lens 110 to the determined optimum position may provide a sharper image than an attempt to drive the lens 110 directly to the infinity position $x_{INF}$.

The position $x_0$ may coincide with the mechanical end of the movement range in the macro side.

$x_M$ denotes the mechanical end of the movement range in the infinity side. The positions $x_M$ and $x_S$ may also coincide (not shown).

The magnitude H1 of a driving step required for driving the actuator from the position $x_S$ to the position $x_A$ may be determined e.g. by calibration, and a parameter specifying the magnitude H1 may be stored in a calibration register. The calibration register may be located e.g. in the memory MEM1. Also the magnitudes of the driving steps H2, H3, H4, H5, H6, H7, H8 for driving between the positions $x_S$, $x_A$, $x_B$, $x_{INF}$, $x_C$, $x_D$, $x_E$, $x_F$, $x_0$ may be determined and stored in a calibration register, respectively.

The magnitude of a movement from the position $s_S$ to the position $x_{INF}$ may be equal to H1+H2+H3. The magnitude of a movement from the position $x_{INF}$ to the position $x_0$ may be equal to H4+H5+H6+H7+H8.

The magnitudes of the driving steps H1, H2, H3, H4, H5, H6, H7, H8 (see table 5) and the parameter Focus_Change of the second register REG2 (see table 2) may be expressed in "focus change units".

If the parameter Focus_Change is set to be equal to the driving step H1, and if the actuator 250 is initially at the position $x_S$ (Start of Controllability), then the end position of the movement will be the position $x_A$ (Point A).

x denotes the position of the actuator (and/or the position of the lens).

The focusing may be adjusted such that the image of an object appearing in the image frame(s) is sharp. In that case, the position of the imaging optics 110 is associated with a certain distance between an object and the imaging optics 110. The calibration register may further comprise information about the actual distance between the object and the imaging optics 110, associated with each of the four positions $x_C$, $x_D$, $x_E$, $x_F$.

It is also possible to have different amount of points A-E depending on the characteristics of the actuator 250. For example, if the point A is missing, the actuator 250 may be driven from the position position $x_S$ (Start of Controllability) to the position $x_B$ (point B) by setting the parameter Focus_Change equal to the driving step H2'.

If the number of points is high enough, also a non-linear actuator 250 may be driven like a linear actuator, because the relationship between the position and a parameter Focus_Change may be substantially linear between two adjacent points (see table 2).

The memory MEM1 may comprise a calibration register comprising calibration parameters. The number of calibration parameters may be varied, because the calibration parameters stored in the memory MEM1 may be indexed by an auto focus configuration register. The configuration register may define the number of available calibration parameters and the location of the available parameters.

Parameters of the calibration register may have a different meaning depending on the actuator technology. For a linear control type actuator (e.g. linear electromagnet), an initial electric current coupled to the coil of the electromagnet may be arranged to be such that the actuator is automatically driven to the position $x_S$ (start of controllability) immediately after startup. The calibration register may comprise information, which specifies said the electric current at the positions $x_S$, $x_A$, $x_B$, $x_{INF}$, $x_C$, $x_D$, $x_E$, $x_F$, $x_0$.

For an actuator with a relative position sensor (See table 3: sensor assisted relative position), the start of controllability may refer to a sensor reading at the far mechanical end (position $x_M$)

Variations due to manufacturing tolerances may be compensated by storing actuator-specific calibration parameters. However, even in that case some parameters, e.g. a minimum macro distance may be substantially the same for each actuator of a manufacturing batch (the minimum macro distance may be e.g. 10 cm). If the calibration register comprises actuator-specific calibration parameters, this may be indicated in the configuration register.

Some calibration parameters may be stored in the calibration register even after manufacturing of the camera module 500. For example, new calibration parameters may be uploaded via internet.

The present solution specifies calibration parameters and position monitoring for actuators 250 such that they can be used with existing autofocus algorithms.

The usage of the calibration parameters may be independent on actuator technology, and the calibration parameters may be generic. This is achieved by grouping the actuators into few main classes based on their control characteristics as follows:

actuators that have linear control characteristics but have orientation offset (VCM)

actuators systems with absolute position systems, e.g. actuator systems with position sensors actuator systems without position sensors but with adequate repeatability (relative type)

actuator systems with a home detection position sensor lens systems without moving optics—focal length variation form lens shape or refractive index change The control unit 400 may be compatible with several different actuators having different operating principles. The actuator type may be specified by configuration parameters indicated in Table 3. The actuator type specifies e.g. how calibration data is utilized, and whether the movements are relative or absolute.

TABLE 3

Different types of actuators specified by the parameter Actuator_Type.

| Parameter | Type | Description |
| --- | --- | --- |
| Actuator_Type Bit0 | 1-bit | 1 = Reproducible position. |
| Actuator_Type Bit1 | 1-bit | 1 = Absolute position. |
| Actuator_Type Bit2 | 1-bit | 1 = Relative position. |
| Actuator_Type Bit3 | 1-bit | 1 = Sensor assisted absolute position. |
| Actuator_Type Bit4 | 1-bit | 1 = Sensor assisted relative position. |
| Actuator_Type Bit5 | 1-bit | 1 = Sensor assisted home position. |
| Actuator_Type Bit6 | 1-bit | 1 = Position unknown at start. |
| Actuator_Type Bit7 | 1-bit | 1 = Home position at far mechanical end. |
| Actuator_Type Bit8 | 1-bit | 1 = Non-moving actuator (e.g. refractive index change). |
| Actuator_Type Bit9 | 1-bit | 1 = Non-linear actuator. |
| Actuator_Type Bit10 | 1-bit | Reserved for future purposes |
| Actuator_Type Bit11 | 1-bit | Reserved for future purposes |
| Actuator_Type Bit12 | 1-bit | Reserved for future purposes |
| Actuator_Type Bit13 | 1-bit | Reserved for future purposes |
| Actuator_Type Bit14 | 1-bit | Reserved for future purposes |
| Actuator_Type Bit15 | 1-bit | Reserved for future purposes |

A single parameter Actuator_Type may comprise all 16 bits mentioned in table 3. The parameter Actuator_Type may be stored e.g. in the memory MEM1 or in the second register REG2.

The parameter Actuator_Type may be stored e.g. in the manufacturing line or in a repair workshop.

If the actuator has a "reproducible position", the actuator may be driven to a predetermined absolute position by starting from the position $x_S$ (start of controllability), and by moving the actuator by a predetermined amount. However further calibration data may be needed to establish the relationship between the absolute positions and the magnitude of movements. The magnitude of movement may be specified e.g. by the parameter Focus_Change (see table 2). Different sets of calibration data may be associated with different operating conditions of the camera module. For example, the orientation of the camera module (lens pointing upwards or downwards) or the operating temperature may have an effect on the relationship between the parameter Focus_Change (in "focus change units") and the actual movement (in millimeters). For example, an electromagnet pulling a mechanical spring (voice coil motor, VCM) may belong to this category.

If the actuator is "absolute", the actuator may be driven to an absolute position specified by the parameter Focus_Change. In this case the parameter Focus_Change specifies absolute position, i.e. there is no need to indicate the direction of movement. For example, a stepper motor may belong to this category.

If the actuator is "relative", the parameter Focus_Change specifies a relative change from a previous position. For example, a piezo-electric actuator without a position sensor may belong to this category. The direction of movement has to be specified, in addition to the parameter Focus_Change.

If the actuator type is "sensor assisted absolute position", the absolute position of the actuator 250 is determined by a position sensor 260. The position may be measured after every completed focus change operation. The position sensor 260 may be e.g. a photoreflector or a Hall Effect sensor.

If the actuator type is "sensor assisted relative position", the position sensor 260 is arranged to detect a change of position with respect to a previous position. The position sensor 260 may be e.g. an optical encoder. The change of position may be measured after every completed focus change operation.

If the actuator type is "sensor assisted home position", the home position ($x_S$) of the actuator is at a point which is different from a mechanical end position ($x_M$).

Referring to the Actuator_Type Bit6, the position of the actuator may be unknown at start.

Referring to the Actuator_Type Bit7, the home position ($x_S$) of the actuator may coincide with the far mechanical end ($x_M$).

The focusing may be based on some other principle than adjusting the distance between a lens and the image detector 122. For example the driving unit 200 may be e.g. arranged to "drive" a lens by changing the refractive index of said lens.

In case of a non-linear actuator, the relationship between a change of absolute position and the parameter Focus_Change may depend on the parameter Focus_Change. For example Focus_Change=100 may provide a displacement which is substantially greater than two times a displacement provided by Focus_Change=50.

Universal calibration parameters may be defined. The controlling software may adaptively use said calibration parameters. Thus, the same software can be used for controlling different types of actuators, or for controlling similar actuators having slightly different calibration parameters.

The number of available calibration parameters may vary. The control unit 400 may be arranged to adaptively utilize all those calibration parameters, which happen to be available.

A component manufacturer has to provide a predetermined minimum set of calibration parameters. The camera module 500 is already fully operational when the minimum set of calibration parameters is stored in the memory MEM1.

However, if the component manufacturer wishes to do so, he may also provide additional calibration parameters e.g. in order to improve accuracy and/or speed of the driving.

The camera module 500 may comprise hardware and software for implementing an automatic camera configuration method called "dynamic camera configuration" (DCC). The dynamic camera configuration specifies, among other things, how said additional calibration parameters may be effectively utilized when performing auto focusing.

The dynamic camera configuration is not necessary for achieving a working camera module, but it provides a way for optimizing the performance of the camera module. The dynamic camera configuration specifies how manufacturer-specific features may be handled. Thus, the driving units 200 and/or the actuators 250 may be replaced with different ones without a need to change the controlling software.

Capability information and calibration parameters provided e.g. by a component manufacturer may be merged with any information contained in an automatic configuration file, and stored e.g. in the memory MEM1. The merged set of information may be used by the control unit 400 (i.e. by the host). If there is conflict between values of the automatic configuration file and the parameters provided by the component manufacturer, the priority is given to the values of the automatic configuration file.

Tables 4, 5, and 6 show various configuration and calibration parameters, which may be determined and stored e.g. in the memory MEM1.

TABLE 4

Configuration parameters (example)

| Parameter | Type | Description |
| --- | --- | --- |
| AF_config_1 bit0 | 1-bit | 1 = data for horizontal orientation available. 0 = not available. |
| AF_config_1 bit1 | 1-bit | 1 = data for upwards orientation available. 0 = not available. |
| AF_config_1 bit2 | 1-bit | 1 = data for downwards orientation available. 0 = not available. |
| AF_config_1 bit3 | 1-bit | 1 = start of controllability available for horizontal orientation. 0 = not available. |
| AF_config_1 bit4 | 1-bit | 1 = start of controllability available for upwards orientation. 0 = not available. |
| AF_config_1 bit5 | 1-bit | 1 = start of controllability available for downwards orientation. 0 = not available. |
| AF_config_1 bit6 | 1-bit | 1 = start of controllability data determined by using 16 bits. 0 = start of controllability data determined by using 8 bits |
| AF_config_1 bit7 | 1-bit | 1 = AF_config_2 parameters exist. 0 = AF_config_2 parameters do not exist. |
| AF_config_2 bit0 | 1-bit | 1 = Different validity parameters are used for the different orientations. 0 = The same validity parameters are used for all orientations. If AF_config_2 bit0 is not available, this means that the same validity parameters are used for all orientations. |
| AF_config_2 bit1 | 1-bit | 1 = PosUnit parameter exists. 0 = does not exist. |

TABLE 4-continued

Configuration parameters (example)

| Parameter | Type | Description |
|---|---|---|
| AF_config_2 bit2 | 1-bit | 1 = Nb-additional parameter exists. 0 = does not exist. |
| AF_config_2 bit3 | 1-bit | Fine_Step-IM parameter exists. 0 = does not exist. |
| AF_config_2 bit4 | 1-bit | 1 = Fine step corresponds to 1 μm. |
| AF_config_2 bit5 | 1-bit | 1 = Fine step is equal to a number which corresponds to a predetermined deviation (e.g. 5%) from the maximum value of the modulation transfer function (MTF). |
| AF_config_2 bit7 | 1-bit | 1 = AF_config_3 register exists. |
| Validity_H bit0 | 1-bit | 1 = Parameter Relative_H_to_A is available. 0 = not available. |
| Validity_H bit1 | 1-bit | 1 = Parameter Relative_H_to_B is available. 0 = not available. |
| Validity_H bit2 | 1-bit | 1 = Parameter Relative_H_to_INF is available. 0 = not available. |
| Validity_H bit3 | 1-bit | 1 = Parameter Relative_H_to_C is available. 0 = not available. |
| Validity_H bit4 | 1-bit | 1 = Parameter Relative_H_to_D is available. 0 = not available. |
| Validity_H bit5 | 1-bit | 1 = Parameter Relative_H_to_E is available. 0 = not available. |
| Validity_H bit6 | 1-bit | 1 = Parameter Relative_H_to_F is available. 0 = not available. |
| Validity_H bit7 | 1-bit | 1 = Parameter Relative_H_to_EOC is available. 0 = not available. |

TABLE 5 a first list of calibration parameters (example).

| Parameter | Type | Description |
|---|---|---|
| Fine_Step_IM | 8-bit | Indicates a number, which corresponds to a fine step movement in infinity to macro direction. Always available for an actuator of relative type. |
| Fine_Step_MI | 8-bit | Indicates a number, which corresponds to a fine step movement in macro to infinity direction. Always available for an actuator of relative type. |
| Start_of_Controllability | 16-bit | Start of controllability in horizontal orientation. This parameter may specify e.g. the start current control word in case of a VCM actuator (voice coil motor actuator). In case of a position sensor assisted system, this parameter may specify the position sensor reading at the far end, e.g. in case of a piezo actuator which has a position sensor. |
| Relative_H_to_A | 16-bit | Specifies the control word difference for driving from the Start of Controllability to the point A. |
| Relative_H_to_B | 16-bit | Specifies the control word difference for driving from the previous stored point to the point B. |
| Relative_H_to_INF | 16-bit | Specifies the control word difference for driving from the previous stored point to the point Infinity. |
| Relative_H_to_C | 16-bit | Specifies the control word difference for driving from the previous stored point to the point C. |
| Relative_H_to_D | 16-bit | Specifies the control word difference for driving from the previous stored point to the point D. |
| Relative_H_to_E | 16-bit | Specifies the control word difference for driving from the previous stored point to the point E. |
| Relative_H_to_F | 16-bit | Specifies the control word difference for driving from the previous stored point to the point F. |
| Relative_H_to_EOC | 16-bit | Specifies the control word difference for driving from the previous stored point to the point End of Controllability. |

It may be noticed that different meanings can be assigned to the parameters Relative_H_to_A, Relative_H_to_B, Relative_H_to_INF, Relative H_to_EOC, depending on the availability of calibration points (A, B, Infinity, C, D, E, and F).

The computer program stored in the memory MEM1 may comprise computer code, which is executed by the control unit 400. The computer program may comprise code for utilizing a minimum set of calibration parameters, and for utilizing an extended set of calibration parameters, depending on configuration information. The computer program may comprise code for checking whether an extended set of calibration parameters is available.

For example, the parameters AF_config_1 bit1, AF_config_1 bit6, and Validity_H bit1 are configuration information. Referring to table 4, AF_config_1 bit1 specifies whether calibration data for upwards orientation of the camera module is available. AF_config_1 bit6 specifies whether start of controllability data is expressed by using 8 bits or 16 bits. Validity_H bit1 specifies whether the magnitude of the driving step H2 is available.

The computer program may comprise computer code for assigning different meanings for calibration information, depending on the configuration information. For example, the parameter Relative_H_to_INF may specify either a first driving step for driving from point B to infinity, or a second driving step for driving from point A to infinity, depending on the parameter Validity_H bit1.

In other words, the computer program may comprise computer code for controlling focusing by using a calibration parameter, wherein said calibration parameter specifies either an interval between a first calibration point (infinity) and a second calibration point (B), or an interval between a first calibration point (infinity) and a third calibration point (A), depending on a configuration parameter (e.g. Validity_H bit1). Said third calibration point (A) is located between said first calibration point (infinity) and said second calibration point (B).

The following examples illustrate the usage of calibration parameters stored in the memory MEM1 of the camera module 500.

Example 1

An apparatus (500) comprising a control unit (400) for controlling focusing of light onto an image detector (122), wherein said control unit (400) is configured to adjust focusing from a first calibration point (Start of Controllability) to a second calibration point (B) by using a first calibration parameter (Relative_H_to_B) such that said first calibration parameter (Relative_H_to_B) specifies the magnitude of a first interval (H2') when a third intermediate calibration point (A) does not exist, and such that said first calibration parameter (Relative_H_to_B) specifies the magnitude of a second interval (H2) when the third intermediate calibration (B) point exists.

Example 2

The apparatus (500) of example 1 wherein said first calibration parameter (Relative_H_to_B) specifies a magnitude (H2') of movement for adjusting focusing from the first calibration point (Start of Controllability) to the second calibration point (B) in a single step when the third intermediate calibration point does not exist, and said first calibration parameter (Relative_H_to_B) specifies a magnitude (H2) of movement for adjusting focusing from the intermediate calibration point (A) to the second calibration point (B) in a single step when the third intermediate calibration point (B) exists.

Example 3

The apparatus (500) of example 2 wherein said control unit (400) is configured to adjust focusing from the first calibration point (Start of Controllability) to the second calibration point (B) by using the first calibration parameter (Relative_H_to_B) and a second calibration parameter (Relative_H_to_A) when the third intermediate calibration point (A) exists, the second calibration parameter (Relative_H_to_A) specifying a magnitude (H1) of movement for adjusting focusing from the first calibration point (Start of Controllability) to the intermediate calibration point (A) in a single step.

Example 4

The apparatus (500) according to any of the examples 1 to 3 comprising a driving unit (200) for adjusting focusing, wherein the control unit (400) is configured to send either an end point (Focus_Change) for a focus adjustment to said driving unit (200) or a magnitude (Focus_Change) for a focus adjustment to said driving unit (200), depending on a value of a configuration parameter (Actuator_Type).

Example 5

A method, comprising:
adjusting focusing from a first calibration point (Start of Controllability) to a second calibration point (B) by using a first calibration parameter (Relative_H_to_B) such that said first calibration parameter (Relative_H_to_B) specifies the magnitude of a first interval (H2') when a third intermediate calibration point (A) does not exist, and such that said first calibration parameter (Relative_H_to_B) specifies the magnitude of a second interval (H2) when the third intermediate calibration (B) point exists.

Example 6

The method of example 5 wherein said first calibration parameter (Relative_H_to_B) specifies a magnitude (H2') of movement for adjusting focusing from the first calibration point (Start of Controllability) to the second calibration point (B) in a single step when the third intermediate calibration point does not exist, and said first calibration parameter (Relative_H_to_B) specifies a magnitude (H2) of movement for adjusting focusing from the intermediate calibration point (A) to the second calibration point (B) in a single step when the third intermediate calibration point (B) exists.

Example 7

The method of example 6 comprising adjusting focusing from the first calibration point (Start of Controllability) to the second calibration point (B) by using the first calibration parameter (Relative_H_to_B) and a second calibration parameter (Relative_H_to_A) when the third intermediate calibration point (A) exists, the second calibration parameter (Relative_H_to_A) specifying a magnitude (H1) of movement for adjusting focusing from the first calibration point (Start of Controllability) to the intermediate calibration point (A) in a single step.

Example 8

The method according to any of the examples 5 to 7 comprising sending either an end point (Focus_Change) for a focus adjustment to a driving unit (200) or a magnitude (Focus_Change) for a focus adjustment to said driving unit (200), depending on a value of a configuration parameter (Actuator_Type).

Example 9

A computer program for executing the method according to any of the examples 5 to 8.

Example 10

A computer readable medium (MEM1) comprising program code, which when executed by a data processor (400) is for executing the method according to any of the examples 5 to 8.

Further calibration parameters are listed in Table 6. These parameters may be used for timing the various method steps performed during auto-focusing. In particular, these parameters may be used to minimize the total time needed for the auto-focusing operation, while simultaneously ensuring adequate accuracy and full compatibility with several different types of actuators 250.

TABLE 6

A second list of calibration parameters (example).

| Parameter | Type | Description |
|---|---|---|
| Max_Speed_H_IM_F | 16-bit | Maximum speed in horizontal orientation for driving from infinity to macro direction in fine stepping. Unit: mm/s |
| Max_Speed_H_IM_C | 16-bit | Maximum speed in horizontal orientation for driving from infinity to macro direction in coarse stepping. Unit: mm/s |
| Max_Speed_H_IM_T | 16-bit | Maximum speed in horizontal orientation for driving over the total range of positions from infinity to macro direction. Unit: mm/s. |
| Min_Speed_H_IM_F | 16-bit | Minimum speed in horizontal orientation for driving from infinity to macro direction in fine stepping. Unit: mm/s |
| Min_Speed_H_IM_C | 16-bit | Minimum speed in horizontal orientation for driving from infinity to macro direction in coarse stepping. Unit: mm/s |
| Min_Speed_H_IM_T | 16-bit | Minimum speed in horizontal orientation for driving over the total range of positions from infinity to macro direction. Unit: mm/s. |
| Repeatability_H | 8-bit | Repeatability of end position when driving in the same direction. Horizontal orientation. Unit: %. |

TABLE 6-continued

A second list of calibration parameters (example).

| Parameter | Type | Description |
|---|---|---|
| Hysteresis_F_H | 8-bit | Difference between the magnitudes of movements when driving in two opposite directions in fine stepping. Horizontal orientation. Unit: %. |
| Hysteresis_F_C | 8-bit | Difference between the magnitudes of movements when driving in two opposite directions in coarse stepping. Horizontal orientation. Unit: %. |
| Linearity_H | 8-bit | Difference between a calculated end position and an actual end position when one fifth of the total range of positions is driven by fine stepping. The calculated end position is calculated by linear extrapolation. Horizontal orientation |
| Duration of homepoint focus change | 8-bit | Duration of lens focus change from near mechanical end to home position. |

The direction of gravity may have an effect on the operation of the actuator 250. Tables 5 and 6 show several calibration parameters for the horizontal orientation of the camera module. Corresponding calibration parameters may also be specified for upwards orientation and downwards orientation of the camera module.

The camera module may comprise an orientation sensor to detect the orientation of the camera module with respect to the direction of gravity. In certain cases, also the combination of the actuator 250 and a position sensor 260 may be arranged to operate also as an orientation sensor. If a first movement in a first direction is larger than a second movement in a second direction, and the movements correspond to the same magnitude (control word difference), this may indicate that the first movement is in the downhill direction, and the second movement is in the uphill direction. If the movements are substantially equal, this may indicate that the movements are substantially horizontal. This principle may be used e.g. in case of a piezo actuator.

Some calibration parameters may be the same for each actuator 250 of a manufacturing batch. Some calibration parameters may be different for different actuators 250 of a manufacturing batch. Camera-to-camera module variation may be stored into a calibration register. The values may be stored in the calibration register during manufacturing of the camera module 500. If the camera module 500 is installed e.g. in a mobile phone, the calibration parameters may also be stored during the manufacturing of the mobile phone.

Figure 5:
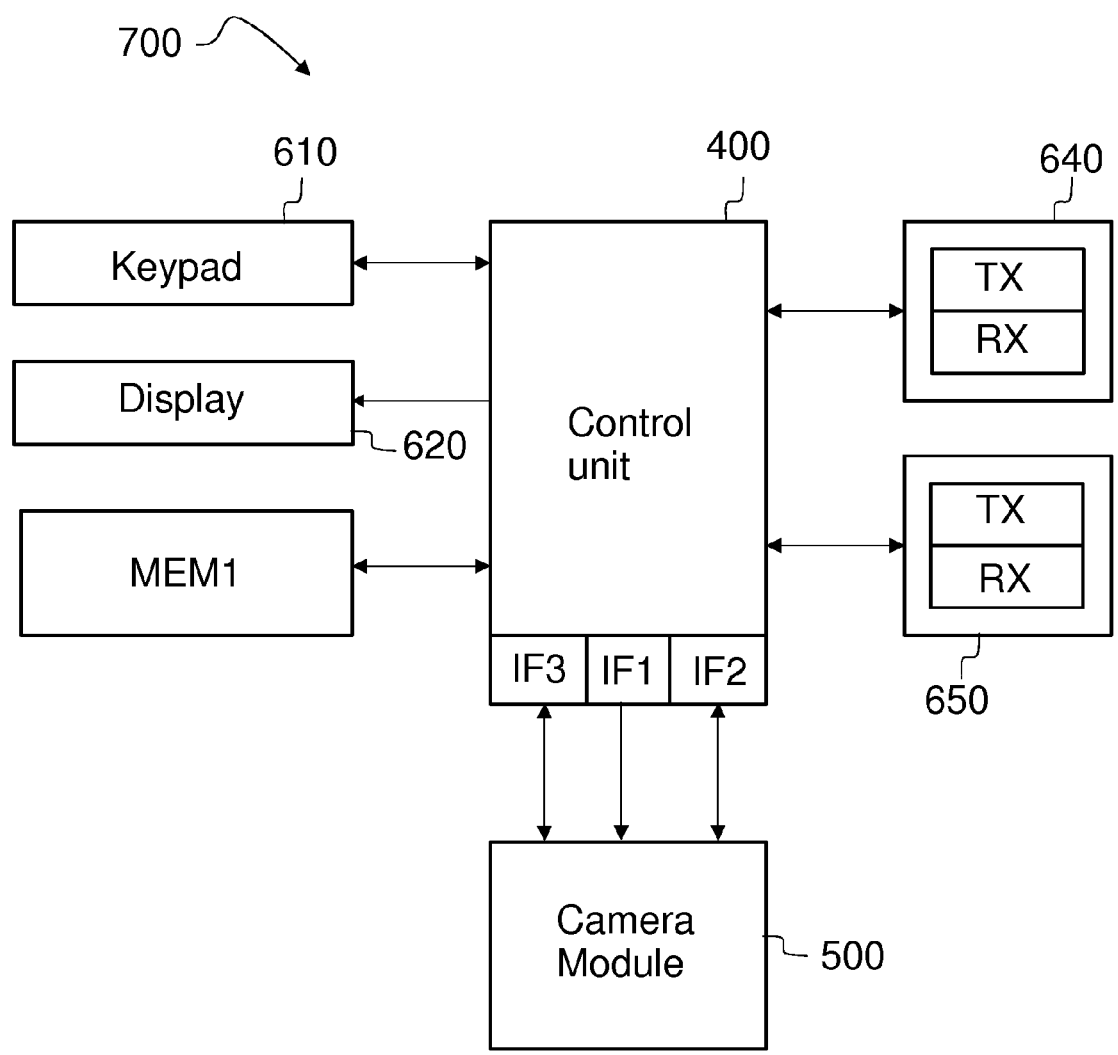
FIG. 5 shows an apparatus comprising a camera module.

Referring to FIG. 5, an apparatus 700 may comprise a camera module 500. The apparatus 700 may further comprise a display 620 for displaying visual information, e.g. text and graphics. The apparatus 700 may further comprise a keypad 610 for entering data and/or for controlling the device 400.

The apparatus 700 may comprise a memory MEM1 e.g. for storing captured image data, a computer program for controlling the operations of the camera module 500 and/or calibration parameters.

The apparatus 700 may comprise a control unit 400 configured to electronically control the operation of the camera module 500.

The imaging optics 110 may be e.g. a single lens or a lens system. The imaging optics 110 may comprise one or more lenses, mirrors, prisms and/or diffractive optics.

The actuator 250 may also be arranged to perform focusing in some other way than by moving the imaging optics 110. For example, the actuator 250 may be arranged to move the image detector 122 instead of the imaging optics 110. The actuator 250 may also be arranged to modify the shape of a lens in order to adjust the focal length of the imaging optics 110. The driver 200 may also be arranged to adjust the refractive index of a lens in order to adjust the focal length of the imaging optics. The actuator 250 may be arranged to replace a first lens with a second lens, wherein the focal length of the second lens is different from the focal length of the first lens. The actuator 250 may be arranged to insert an additional lens to the optical path.

The actuator 250 may be based e.g. on a DC motor (direct current motor), on a stepper motor, on a piezo-electric mechanism, or on an electromagnet.

The imaging optics 110 and/or the actuator 250 and/or the driving unit 200 may also be detachable from the camera module 500. In particular, the combination of the imaging optics 110, the actuator 250, and the driving unit 200 may form a single detachable unit. Thus, different objectives may be easily attached to the same camera module by using a standardized interface.

The camera module 500 may comprise the control unit 400, or the control unit 400 may be an external component.

The image sensor 150 and driving unit 200 can be located in separate physical chips or in the same chip. This mechanism without affecting the functionality of auto focus software builds a modular approach, which allows different physical separation even the image sensor 150 and the driving unit 200 are separate devices.

This is beneficial when a first type of actuators mandates separation (e.g. due to high voltage driving) while another type of actuators allows integration, if desired.

The image sensor 150 may comprise the pulse generator 120. However, the pulse generator 120 may also be separate from the image sensor 150, provided that the image sensor 150 is arranged to send the line number $k_L$ or information about a detected event to the pulse generator substantially without delay.

The image sensor 150 and the driving unit 200 may be implemented on different integrated circuits. Thus, the image sensor 150 and the driving unit 200 may be manufactured in different factories.

The synchronization pulses may also be called as "strobes". The synchronization pulses may be e.g. electrical or optical. The synchronization pulses may be logical signals or analog signals.

In general, the camera module 500 may comprise a synchronization signal generating unit 120, which is arranged to generate synchronization signals $S_{11}$, $S_{12}$, $S_{13}$. In particular, the synchronization signals $S_{11}$, $S_{12}$, $S_{13}$ may be synchronization pulses. The timing information of the synchronization signals $S_{11}$, $S_{12}$, $S_{13}$ may be sent e.g. by changing the magnitude of a voltage (amplitude modulation), by changing the phase of an alternating voltage (phase-coded information), by changing the frequency of an alternating voltage (frequency modulation), or by changing the intensity of wavelength of an optical signal.

The lens 110 and the actuator 250 may be arranged to move together so that the magnitude of a movement of the lens 110 is equal to the magnitude of a movement of the actuator 250. Thus, a movement of the actuator 250 implies a movement of the lens 110, and vice versa.

The camera module 500 may optionally comprise a position sensor 260 for detecting the position of the imaging optics 110 and/or the position of the actuator 250.

The camera module 500 may optionally comprise a mechanical or optical shutter (not shown) for blocking access of light to the image detector 122. The shutter may be controlled by a further actuator (not shown).

The camera module 500 may optionally comprise a controllable aperture (not shown) for controlling optical power of light transmitted to the image detector 122. The aperture may be controlled by a further actuator (not shown).

The camera module 500 may optionally comprise a movable or adjustable neutral density filter (not shown) for controlling the intensity of light transmitted to the image detector 122. The neutral density filter may be controlled by a further actuator (not shown).

Information related to different actuators may be stored in the memory MEM1. Said information may be organized such that it can be easily increased and administered.

The interfaces IF1, IF2, IF3 may be separate or they may be portions of the same interface.

The strobe generator 120 may comprise the first register REG1. The driver 200 may comprise the second register REG2.

However, the registers REG1, REG2 may also be located at the control unit 400, or at some intermediate location if the pulse generator 120 and the driver 200 can read the contents of the registers substantially without delay.

The apparatus 700 may comprise communication units 640, 650 having a transmitter TX and/or a receiver RX. A first communication unit 640 may be arranged to transfer data e.g. via a mobile telephone network, and a second communication unit 650 may be arranged to transfer data e.g. via Bluetooth™, WLAN system (Wireless Local Area Network) or other short-range communication system. The apparatus 700 may be arranged to transfer data to/from the internet.

The apparatus 700 may comprise other means, such as audio means, including an earphone and a microphone and optionally a codec for coding (and decoding, if needed) audio information.

Yet, the apparatus 700 may operate with location/positioning systems, e.g. a GPS. The apparatus 700 may have other functionalities or can be connected to other computerized systems.

The apparatus 700 may be, for example, selected from the following list: a mobile phone, a digital camera, a camera module connectable to a further device, portable device, device with wireless telecommunicating capabilities, imaging device, gaming device, music recording/playing device (based on e.g. MP3-format), navigation instrument, measuring instrument, target finding device, aiming device, navigation device, personal digital assistant (PDA), communicator, portable internet appliance, hand-held computer, accessory to a mobile phone.

The parameters listed in tables 1-3 may be incorporated in a SMIA++ standard, created by the company Nokia. Interoperability may be guaranteed whenever the image sensor 150, the driving unit 200, and the control unit 400 comply with the SMIA++ standard.

Separation and definition of the first parameter register REG1 and the second parameter register REG2 enables flexible location for the driving unit 200. The driving unit 200 may be a separate device utilizing discrete components, or the driving unit 200 may be located on the same (silicon) chip as the image sensor 150, without any impact on the autofocus software.

A universal host may be defined to incorporate such predetermined adaptivity. Location and address space may be defined for the driving unit 200 and the image sensor 150 e.g. in capability registers defined in the SMIA++ standard.

Tables 1-6 are not exhaustive, i.e. several further parameters may be defined, which are not shown in tables 1-6.

For the person skilled in the art, it will be clear that modifications and variations of the devices and the methods according to the present invention are perceivable. The drawings are schematic. The particular embodiments described above with reference to the accompanying drawings are illustrative only and not meant to limit the scope of the invention, which is defined by the appended claims.

The invention claimed is:

1. An apparatus comprising:
an image detector for capturing an image frame,
a driving unit for adjusting focusing of light onto said image detector, and
a synchronization signal generating unit,
wherein said synchronization signal generating unit is configured to generate a synchronization signal corresponding to a start time of optical exposure of a predetermined portion of said image frame, and said driving unit is configured to initiate said adjusting based on a timing of said synchronization signal, and
wherein said synchronization signal generating unit is further configured to generate a plurality of successive synchronization signals, and said apparatus further comprises a control unit configured to change a value of a delay parameter which specifies a time delay between said synchronization signals.

2. The apparatus of claim 1 wherein optical exposure of a first portion of said image frame is configured to take place earlier than optical exposure of a second portion of said image frame.

3. The apparatus of claim 1 wherein said synchronization signal generating unit is configured to generate at least one synchronization signal when the optical exposure of said predetermined portion is started.

4. The apparatus of claim 1 wherein said synchronization signal generating unit is configured to generate at least one synchronization signal when the optical exposure of said predetermined portion is finished.

5. The apparatus according to claim 1 wherein said predetermined portion is a predetermined line of pixels of said image frame.

6. The apparatus according to claim 1 comprising a first parameter register having a re-writable parameter, which specifies the location of said predetermined portion with respect to said image frame.

7. The apparatus of claim 6 wherein said first parameter register comprises a re-writable parameter specifying the number of said synchronization signals and/or the time delay between said synchronization signals.

8. The apparatus according to claim 1 comprising a second parameter register having a re-writable parameter specifying direction and/or magnitude for said adjusting.

9. The apparatus of claim 8 wherein the control unit is configured to write either an end point for a focus adjustment or a magnitude for a focus adjustment to said second register, depending on the value of a parameter.

10. The apparatus of claim 8 herein said second register comprises a parameter, which specifies whether said adjusting is performed by using a single magnitude of adjustment or by using two different magnitudes of adjustment.

11. The apparatus according to claim 8 wherein said driving unit comprises said second register.

12. The apparatus according to claim 8 wherein said first register and said second register are located on different semiconductor chips.

13. A method comprising:
capturing an image frame by an image detector,
adjusting focusing of light onto said image detector by a driving unit,
generating a synchronization signal corresponding to a start time of optical exposure of a predetermined portion of said image frame,
initiating said adjusting based on a timing of said synchronization signal,
generating a plurality of successive synchronization signals, and
changing a value of a delay parameter, which specifies a time delay between said synchronization signals.

14. The method of claim 13 wherein optical exposure of a first portion of said image frame takes place earlier than optical exposure of a second portion of said image frame.

15. The method of claim 13 wherein at least one synchronization signal is generated when the optical exposure of said predetermined portion is started.

16. The method of claim 13 wherein at least one synchronization signal is generated when the optical exposure of said predetermined portion is finished.

17. The method according to claim 13 wherein said predetermined portion is a predetermined line of pixels of said image frame.

18. The method according to claim 13 comprising changing the value of a trigger parameter stored in a first parameter register, said trigger parameter specifying the location of said predetermined portion with respect to said image frame.

19. The method of claim 13 wherein said delay parameter is stored in said driving unit.

20. The method of claim 18 comprising storing the trigger parameter and the delay parameter in parameter registers, which are located on different semiconductor chips.

21. The method according to claim 13 comprising changing the value of a parameter specifying direction and/or magnitude for said adjusting.

22. The method according to claim 13 comprising checking the value of an identifier, and writing either an end point for a focus adjustment or a magnitude for a focus adjustment to a second register, depending on the value of said identifier.

23. The method according to claim 13 comprising performing said adjusting by using two different magnitudes of adjustment.

24. A computer program product comprising a non-transitory computer readable medium having executable program code stored thereon, which when executed by a processor causes an apparatus to perform the method according to claim 13.

25. A device for adjusting focusing of light onto an image detector, wherein said device comprises an input for receiving a synchronization signal corresponding to a start time of optical exposure of a predetermined portion of an image frame, and said device is configured to start said adjusting based on a timing of said synchronization signal, wherein said input is further configured to receive a plurality of successive synchronization signals, and wherein a changeable value of a delay parameter specifies a time delay between said synchronization signals.

26. The device of claim 25 comprising a second parameter register, wherein said second parameter register comprises a parameter specifying direction and/or magnitude for said adjusting.

27. A device comprising:
an image detector for capturing an image frame,
a synchronization signal generating unit configured to generate a synchronization signal corresponding to a start time of optical exposure of a predetermined portion of said image frame, and
an output for transmitting said synchronization signal to a driving unit for adjusting focusing of light onto said image detector, wherein said driving unit is configured to initiate said adjusting based on a timing of said synchronization signal, and
wherein said synchronization signal generating unit is further configured to generate a plurality of successive synchronization signals, and said device further comprises a control unit configured to change a value of a delay parameter which specifies a time delay between said synchronization signals.

28. The device of claim 27 comprising a first parameter register, wherein said first parameter register comprises a parameter specifying the location of said predetermined portion with respect to said image frame.

29. An apparatus comprising:
a means for capturing an image frame,
a means for adjusting focusing of light onto said image detector, and
a means for generating synchronization signals,
wherein said means for generating synchronization signals is configured to generate a synchronization signal corresponding to a start time of optical exposure of a predetermined portion of said image frame, and said means for adjusting is configured to initiate said adjusting based on a timing of said synchronization signal, and
wherein said means for generating synchronization signals is further configured to generate a plurality of successive synchronization signals, and said apparatus further comprises a control means for changing a value of a delay parameter which specifies a time delay between said synchronization signals.

30. The apparatus of claim 29 wherein optical exposure of a first portion of said image frame is configured to take place earlier than optical exposure of a second portion of said image frame.

31. A method comprising:
capturing an image frame by an image detector,
adjusting focusing of light onto said image detector by a driving unit,
generating one or more synchronization signals based on a timing of optical exposure of a predetermined portion of said image frame,
performing said adjusting based on a timing of said one or more synchronization signals,
changing a value of a trigger parameter stored in a first parameter register, said trigger parameter specifying a location of said predetermined portion with respect to said image frame,
generating a plurality of successive synchronization signals, and
changing a value of a delay parameter, which specifies a time delay between said synchronization signals.

* * * * *